Dec. 30, 1924.

W. S. HUFF 1,521,555

BRACING APPARATUS FOR FIREPROOF TANKS

Filed March 12, 1921   3 Sheets-Sheet 1

WITNESSES

INVENTOR
Wilson S. Huff,
BY
ATTORNEYS

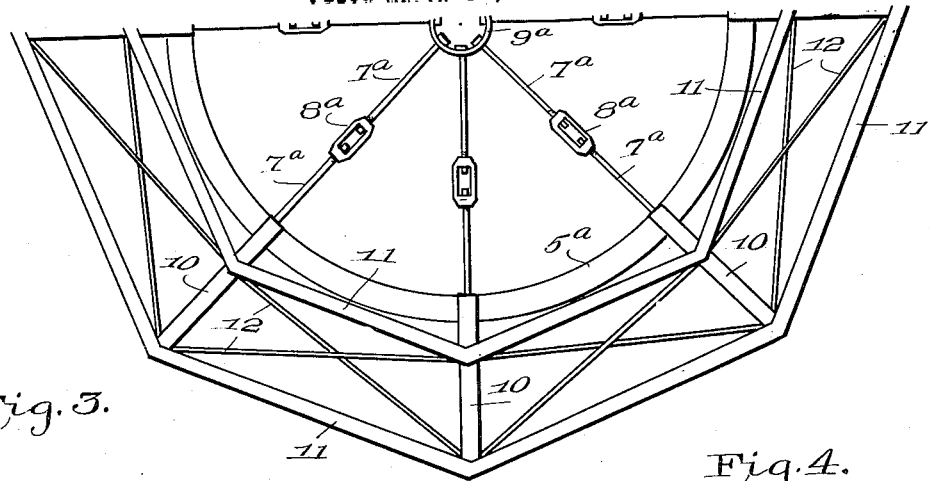

Dec. 30, 1924.
W. S. HUFF
1,521,555
BRACING APPARATUS FOR FIREPROOF TANKS
Filed March 12, 1921     3 Sheets-Sheet 3
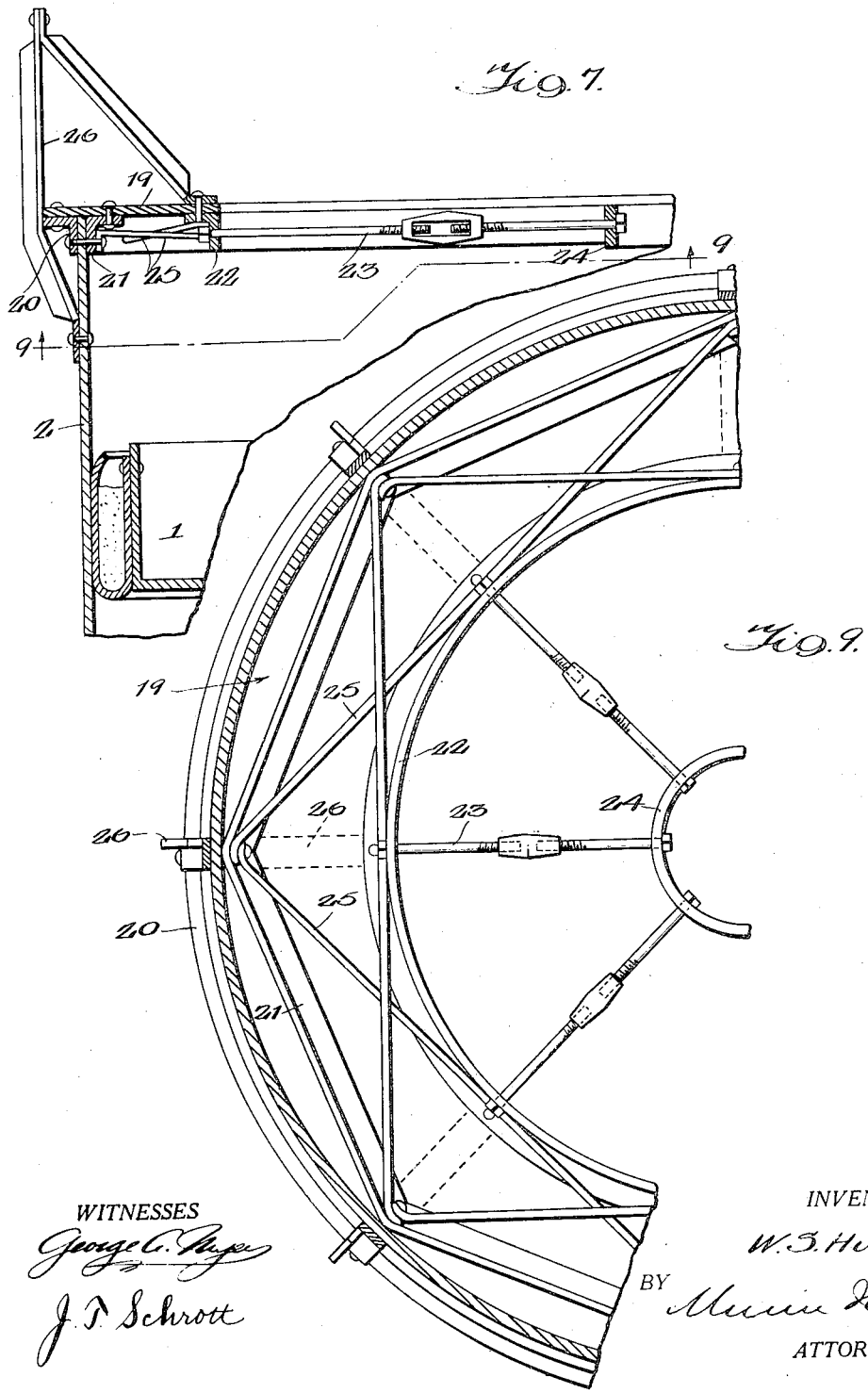
WITNESSES
INVENTOR
W. S. HUFF,
BY
ATTORNEYS Patented Dec. 30, 1924.

1,521,555

UNITED STATES PATENT OFFICE.

WILSON SYLVESTER HUFF, OF OKLAHOMA CITY, OKLAHOMA.

BRACING APPARATUS FOR FIREPROOF TANKS.

Application filed March 12, 1921. Serial No. 451,375.

*To all whom it may concern:*

Be it known that I, WILSON SYLVESTER HUFF, a citizen of the United States, and a resident of Oklahoma City, in the county of Oklahoma and State of Oklahoma, have invented certain new and useful Improvements in Bracing Apparatus for Fireproof Tanks, of which the following is a specification.

My invention relates to improvements in fire-proof tanks, and it consists in the constructions, combinations and mode of operation herein described and claimed.

One of the foremost objects of the invention is to provide means for adequately bracing large liquid containers or tanks, so as to prevent distortion thereof and the consequent hindrance to the proper functioning of the cover or floating tank on the surface of the liquid.

A further object is to provide such bracing means in a variety of forms, one of such forms embodying a ring-like cover for the additional purpose of partially shielding the joint-forming means between a floating cover beneath and the container wall.

Other objects and advantages will appear in the following specification, reference being had to the accompanying drawings, in which—

Figure 2:
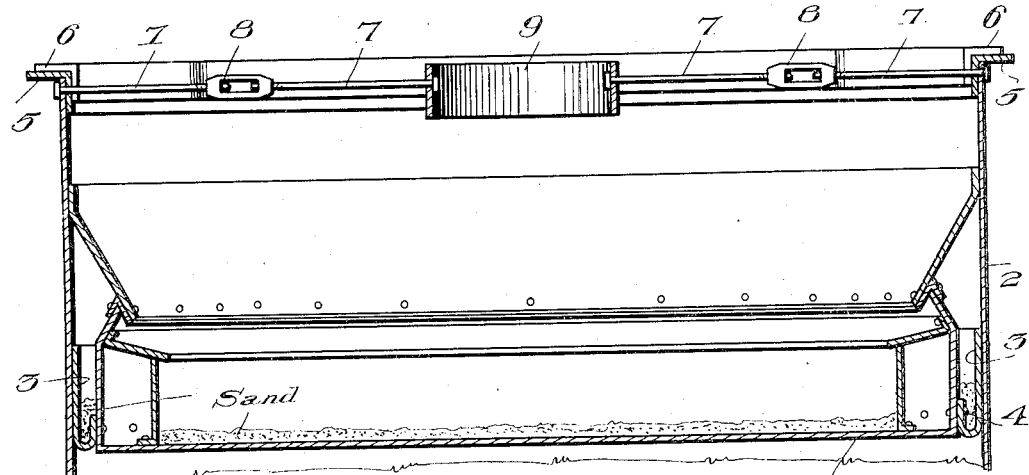
Figure 1:
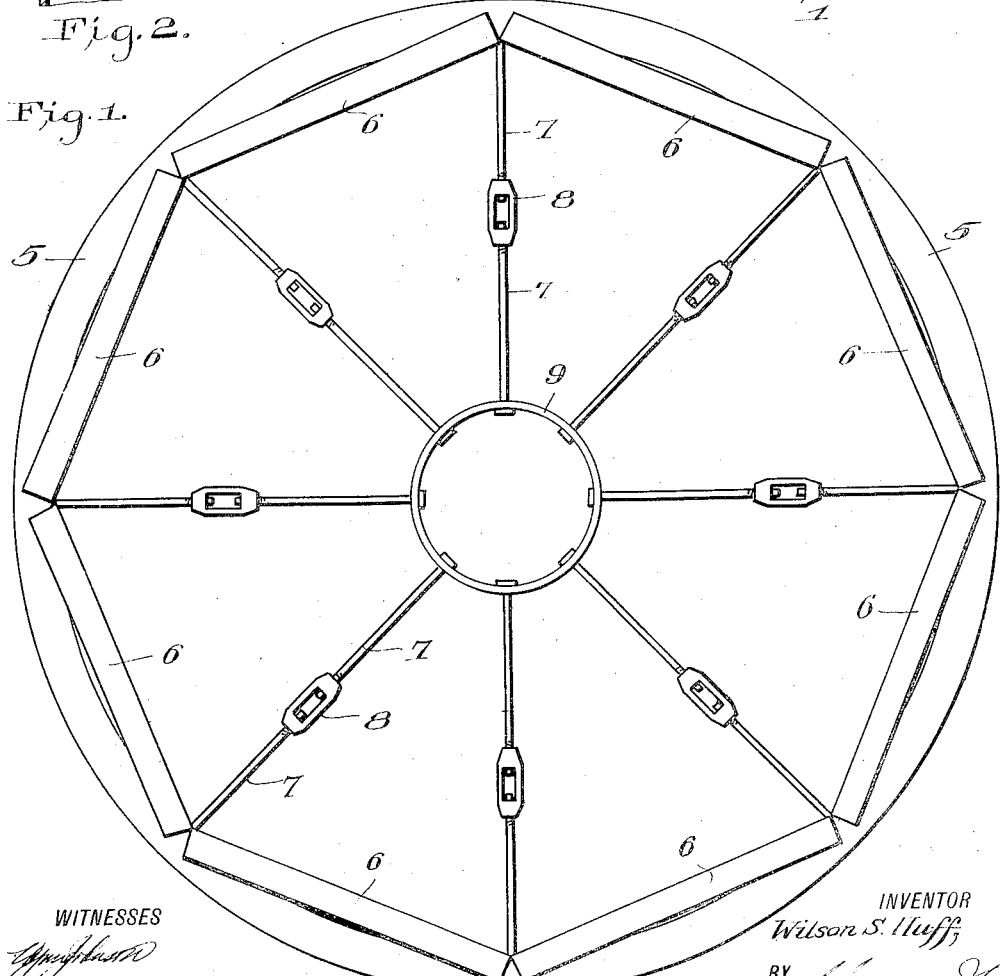

Figure 1 is a plan view of a large tank, illustrating an important form of bracing means for the upper edge, Figure 2 shows a vertical section of the tank, the floating tank which covers the surface of the liquid being shown in place, Figure 3 is a plan view of a part of a large tank, illustrating a trussed framework for bracing the upper edge, Figure 4 is a detail section of a part of the tank in Figure 1, stay bolts being shown in substitution of the turn-buckles and rods, Figure 5 is a detail perspective view of a slight modification of the construction in Figure 1, wherein the flanges of the bracing angle irons are turned up instead of down, and welded where they join, Figure 6 is a detail sectional view of a further modification of bracing means, more clearly defined below, Figure 7 is a detail sectional view of one side of an oil container, illustrating the embodiment of a ring-like cover in the edge bracing means, Figure 8 is a slight modification of the construction shown in Figure 7, wherein a conical ring-like cover is employed instead of a flat ring as in Figure 7.

Figure 9 is a cross section on the line 9—9 of Fig. 7 illustrating the various bracing structures in inverted plan.

By way of introduction it must be pointed out that there is a very important co-relation between the floating tank 1, or cover for the liquid in the outer container or tank 2, and the bracing means at the top of that tank. Suitably fixed to the floating tank 1 is a sheet, or combination of sheets, of flexible material 3, forming an annular pocket which contains sand 4.

This sand is for the purpose of pressing the free side of the flexible sheet against the wall of the container 2, so as to make a good joint between the moving and stationary tanks, and prevent the evaporation of the liquid. The structure of this joint and its modification is more fully disclosed in my co-pending application for fire-proof tanks, filed July 21, 1919, Serial No. 312,188.

It will be seen at once that in order to insure the proper functioning of the floating tank 1, and its joint-making structure 3, 4, the outer tank 2 must be prevented from warping, sagging in places, or from any other minor distortion. The bracing means at the top prevents any tendency of the container 2 towards getting out of shape.

The forms in Figures 1 and 2, illustrate an angle iron 5 suitably secured to the perimeter of the tank. The depending flange of the angle iron may be located either on the inside as illustrated in Figure 2, or on the outside. The angle iron 5 is curved to properly fit the container.

A series of straight angle irons 6 is disposed around the inside of the container, vertical flanges down, substantially as shown in Figure 1. The ends of the angle irons are either welded or otherwise secured to each other and to the container where they contact the latter. In order that the container may be drawn to shape and thus preserved, a plurality of rods 7 with turnbuckles 8 radiate from a central ring or collar 9 and are suitably secured to the container 2, at the places where the angle irons 6 meet.

The form in Figure 3, comprises the annular angle irons 5ª, rods and turn-buckles 7ª and 8ª, and central rings 9ª, all as before, but the straight angle irons 6 are now replaced by a trussed bracing on the outside of the container. Angle or other irons 10 are suitably secured to the circular angle irons 5ª in radial continuation of the rods 7ª, a plurality of braces 11 joining the radial angle irons 10 at suitable places.

Truss rods 12 run diagonally from the meeting places of the irons 10 and braces 11. The various points of contact may be secured in any desired manner, welding, riveting, bolting, etc., being resorted to as may be deemed most expedient.

The form in Figure 4, is substantially like that in Figures 1 and 2, the difference being that stay bolts 13 are employed instead of the turn-buckles and rods shown in the first form. The stay bolts radiate from the central ring 9ᵇ and extend through the flanges of the angle irons 5 and 6 and the container 2, the ends being provided with nuts 14, which can be adjusted on the threaded ends to draw the container up into shape.

The form in Figure 5, comprises an angle iron 5ᶜ which is secured to the upper edge of the container 2 on the outside as illustrated or on the inside as shown in Figure 2, which is braced by a series of straight angle irons 6ᶜ. In this instance the bracing angle irons are laid on top of the angle iron 5ᶜ, and upper edge of the container, vertical flanges up, instead of down as in Figure 2, the various points of contact being again secured as may be deemed most convenient.

The abutting edges of the angle iron 6ᶜ are welded, to illustrate one mode of fastening, and the radiating rods or stay bolts 15 pass through the places where the welds occur. This arrangement disposes the rods or bolts 15 slightly higher above the edge of the container so that more room is provided in the center of the container than in any of the preceding forms.

The form in Figure 6, illustrates a system of bracing which provides a great deal more room in the upper region of the container 2, in fact leaving the whole upper part unobstructed so that the floating tank 1 may move up and perhaps out quite a considerable distance.

The central ring 9ᵈ has radiating stay bolts, or turn-buckle rods 16 as before, the outer ends of which are adjustably secured to the upper part of a frame-work 17. This frame-work is supported by the annular angle iron 5ᵈ through the medium of radiating pieces 18 which may or may not be in alignment with the stay bolts 16. The lower ends of the frame-work 17 are secured to the container at 19.

The form in Figure 7, illustrates the use of a ring-like cover 19, for additionally strengthening the bracing means of the container 2, whether that bracing means be on the order illustrated in Figure 1 or Figure 3. Figure 7 is a composite view illustrating both forms of bracing means.

The annular angle iron 20, around the edge of the container, corresponds to the angle iron 5 in Figure 1. There is a plurality of straight angle irons 21 (Fig. 9) on the inside of the container, corresponding to the angle iron 6 in the first form referred to. The outer edge of the cover 19 is secured to both angle irons, the inner edge being strengthened by an annular angle collar 22, which also enables the attachment of either turn buckle rods 23, as shown, stay bolts, or equivalent bracing means.

Attention is directed to Figure 9. This is a section of the container 2 (Fig. 7) looking upward. The arrangement of the various bracing irons and cross braces is clearly shown.

A ring 24, in the center of the container, provides the mounting for the inner ends of the turn-buckle rods, etc. In addition to the foregoing, cross braces 25 span the space between the angle collar 22 and the irons 21. These bracing rods correspond to those shown in Figure 3, the reader observing that substantially the same trussed framework is here employed, the only difference being that the framework is disposed on the inside of the container instead of on the outside.

In order to avoid any possible sagging of the cover 19, braces 26 are erected around the edge of the container. These braces correspond somewhat to the framework in Figure 6, they being on such order that the inner edge of the cover 19 is supported against inclining downwardly. The cover 19, besides performing a strengthening function for the bracing framework, protects the joint-forming means of the floating tank 1 against filling with water when the rain beats in at the top of the container.

The form in Figure 8, is substantially like that in Figure 7, the cover 26 being of a frusto-conical shape instead of flat. The straight angle irons 27 are fitted around the edge of the container 2 on the inside as in Figure 1, the horizontal flanges lying over the edge, where they contact. It is anticipated that the frusto-conical shape of the cover in Figure 8 will obviate the necessity of providing additional bracing means, because a cover of this particular shape has considerable strength of its own and there will be no likelihood of its sagging down in the middle.

While the construction and arrangement of the tank bracing apparatus as herein described and claimed, is that of a generally preferred form, obviously modifications and changes may be made without departing from the spirit of the invention or the scope of the claims.

I claim:—

1. The combination of a container, a cover floating on the liquid therein, with circumferentially applied means for making a tight joint between the two; means for bracing the container against distortion of the upper edge and the consequent hindrance to the functioning of said cover and joint-making means; said means comprising annular and straight angle irons applied to the upper edge of the container, an annular spaced angle collar; a ring-like cover disposed between said irons and collar, and additional bracing means for strengthening the inner edge.

2. The combination of a container, a cover floating on the liquid therein having circumferentially applied means for making a joint between the two, means applied around the upper edge of the container to rigidify the same, and other means contacting the edge at intervals to further brace the container and prevent distortion thereof to the consequent hindrance to the functioning of said cover and joint-making means.

3. The combination of a container, a cover floating on the liquid therein with a circumferentially applied means for making a joint between the two, means situated on the upper edge of the container to form a brace, means embodied as a part of the bracing means constituting a hood above the space between the cover and container, and bracing means erected around the edge of the container to augment said bracing means and prevent said hood sagging.

4. Means for bracing containers comprising a central body, means radiating therefrom toward the container wall including means for effecting adjustments, an annulus to which the ends of said radiating means are connected, means applied to the edge of the container, a series of bars disposed around the edge of the container and suitably secured at points of contact, and cross braces disposed between the bars and said annulus.

5. Bracing means for containers comprising a central body, means radiating therefrom toward the container wall including length-adjusting means, an annulus to which the ends of said radiating means are connected, a circular reinforcing structure applied to the outer edge of the container, a plurality of bars arranged around the inner edge of the container and fastened at points of contact, and a plurality of rods extended between and fastened at the ends to the bars and said annulus respectively to act as braces for the annulus.

6. A container having circumambient bracing means applied thereto, and other bracing means consisting of a plurality of straight pieces affixed to the container at the ends only thereby defining a polygonal figure.

7. A container having bracing means for the upper edge applied to and following the periphery, and a plurality of straightening pieces also for bracing the upper edge but having contact with the container at the ends only thereby defining a polygonal figure.

8. A container having bracing means applied to the edge thereof, a plurality of bars contacting the container at the ends only and thereby defining a polygonal figure, and means defining a hood secured to the peripheral bracing means contacting said bars and extending inwardly in respect to the container.

9. A container having bracing means applied peripherally and flush with the upper edge, a plurality of straight bars applied to the container at the ends only and flush with the upper edge, and a cover resting on both the bracing means and bars.

10. A container having bracing means applied to the periphery flush with the upper edge, a plurality of straight bars secured inside of the container at the ends only and flush with the upper edge, a ring-like cover laid upon the bracing means and bars and secured thereto, and bracing means erected around the edge of the container including members attached to the inner part of said ring-like cover to prevent it from sagging.

11. A container having bracing means applied to the periphery flush with the upper edge, a plurality of straight bars secured inside of the container at the ends only and flush with the upper edge, a ring-like cover laid upon the bracing means and bars and secured thereto, bracing means erected around the edge of the container including members attached to the inner part of said ring-like cover to prevent it from sagging, and an annulus disposed at the inner part of said cover and secured thereto with said members.

12. A container having bracing means applied to the periphery flush with the upper edge, a plurality of straight bars secured inside of the container at the ends only and flush with the upper edge, a ring-like cover laid upon the bracing means and bars and secured thereto, bracing means erected around the edge of the container including members attached to the inner part of said ring-like cover to prevent it from sagging, an annulus disposed at the inner part of said cover and secured thereto with said members, and rods extending from the annulus to said straight bars furnishing bracing means beneath said cover.

13. A container having bracing means applied to the periphery flush with the upper edge, a plurality of straight bars secured inside of the container at the ends only and flush with the upper edge, a ring-like cover laid upon the bracing means and bars and secured thereto, bracing means erected around the edge of the container including members attached to the inner part of said ring-like cover to prevent it from sagging, an annulus disposed at the inner part of said cover and secured thereto with said members, a central body and a plurality of turnbuckle rods radiating therefrom to points of connection with said annulus.

WILSON SYLVESTER HUFF.